(12) United States Patent
Morris et al.

(10) Patent No.: US 7,845,003 B2
(45) Date of Patent: Nov. 30, 2010

(54) TECHNIQUES FOR VARIABLE SECURITY ACCESS INFORMATION

(75) Inventors: Cameron Craig Morris, Saratoga Springs, UT (US); Lloyd Leon Burch, Payson, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1051 days.

(21) Appl. No.: 11/590,121

(22) Filed: Oct. 31, 2006

(65) Prior Publication Data

US 2008/0115223 A1 May 15, 2008

(51) Int. Cl.
*G06F 21/00* (2006.01)
*G06F 7/04* (2006.01)
(52) U.S. Cl. .......................................... 726/8; 713/183
(58) Field of Classification Search ....................... 726/8
See application file for complete search history.

(56) References Cited

U.S. PATENT DOCUMENTS

| | | | |
|---|---|---|---|
| 5,263,158 A | 11/1993 | Janis | |
| 5,323,146 A | 6/1994 | Glaschick | |
| 5,375,243 A | 12/1994 | Parzych et al. | |
| 5,682,475 A | 10/1997 | Johnson et al. | |
| 5,862,323 A * | 1/1999 | Blakley et al. | 726/13 |
| 5,892,828 A | 4/1999 | Perlman | |
| 7,120,862 B1 | 10/2006 | Ong | |
| 7,530,097 B2 * | 5/2009 | Casco-Arias et al. | 726/6 |
| 2004/0177272 A1 | 9/2004 | Walter | |
| 2006/0080729 A1 * | 4/2006 | Koh et al. | 726/5 |
| 2007/0050850 A1 * | 3/2007 | Katoh et al. | 726/27 |

FOREIGN PATENT DOCUMENTS

| | | |
|---|---|---|
| EP | 1685471 | 1/2008 |
| WO | WO 0011534 A1 | 3/2000 |
| WO | WO 03062969 A1 | 7/2003 |

* cited by examiner

*Primary Examiner*—Matthew B Smithers
(74) *Attorney, Agent, or Firm*—Schwegman, Lundberg & Woessner, P.A.

(57) ABSTRACT

Techniques for variable security access information are presented. The complexity levels associated with access secrets drive the assigned access rights to target resources. A single target resource may have varying sets of access rights, where each set is associated with a particular complexity level for a given access secret. A requesting principal can custom establish the principal's desired access secret complexity level for a target resource; this in turn drives the set of access rights for the target resource, which the principal may use when accessing the target resource.

25 Claims, 3 Drawing Sheets

TECHNIQUES FOR VARIABLE SECURITY ACCESS INFORMATION

FIELD

The invention relates generally to security and more particularly to techniques for variable security access information.

BACKGROUND

Enterprise electronic assets are typically protected via a variety of security mechanisms. One such mechanism is a user-supplied id-password combination that an enterprise's security system requires before access to a desired asset is given with the enterprise. Generally, the access permissions given to the user, in the above mentioned scenario depends in large part on the identified user and the identified resource.

Normally, the user has no control over the format of the password supplied to the security system. So, if the format for the user password requires it to be eight characters in length and include at least one non alphabetic character, the user cannot supply an alternative arrangement when the user initially sets the password or supplies a new password when a prior password expires on the user.

Administrators decide on password formats and password complexity based on a variety of competing interests. First, administrators want passwords to be sufficiently complex enough that the passwords are not easily compromised by automated programs or nefarious intruders. At the same time, the administrators do not want the formats to be so complex that the users have a difficult time remember them. In fact, passwords that are overly complex may actually create unexpected security breaches because the users may resort to writing their passwords down on sticky notes or memo pads where nefarious individuals can acquire them to gain access to the enterprise's assets.

One attribute, which may be associated with a password's complexity, is the length of time which the password remains valid before it expires. So, a password with a large degree of complexity may not expire at all; whereas a password with little to no complexity may expire in a few days or even hours.

Administrators perform balancing acts password complexity and password expiration lengths. The goal is to prevent unauthorized password detection and usage while maintaining usability from the perspective of the users.

Other considerations may also weigh heavily on the minds of administrators, such as how particular assets will be accessed and by which users and perhaps during what time frames. Such considerations often require the administrator to set up multiple and sometimes disparate security systems within the enterprise, since existing security access mechanisms do not permit such customization and security access granularity.

Thus, what is needed is a mechanism that allows for custom and variable security information to be used when accessing assets of an enterprise without sacrificing desired security levels.

SUMMARY

In various embodiments, techniques for enforcing security using variable security information are provided. More specifically, and in an embodiment, a method is presented for enforcing security using variable security information is presented. An access secret is received from a principal and a strength level is determined for the access secret. Next, access rights to one or more resources are dynamically resolved in response to the strength level and policy. Finally, the principal is presented with the access rights, which are associated with the principal and the access secret, to interact with the one or more resources.

DETAILED DESCRIPTION

A "resource" includes a user, content, a processing device, a node, a service, an application, a system, a principal, a directory, a data store, groups of users, combinations of these things, etc. A "principal" is a type of resource that engages in a communication session with one or more other resources for purposes of gaining access to those resources and sub resources controlled by those resources. In an embodiment, a "principal" may be viewed as a user or as an automated application or service. The terms "service" and "application" may be used interchangeably herein and refer to a type of software resource that includes instructions, which when executed by a machine performs operations that change the state of the machine and that may produce output to drive the processing of other machines or resources.

A resource is recognized via an "identity." An identity is authenticated via various techniques (e.g., challenge and response interaction, cookies, assertions, etc.) that use various identifying information (e.g., identifiers with passwords (ID-password combinations), biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given communication session, etc.).

An identity for a principal is at least partially resolved via an authentication technique in which the principal supplies or is identified by a single identifier and one or more authentication secrets (e.g., passwords, biometric data, digital signatures, digital certificates, etc.). As used herein the phrase "access secret" may be used interchangeably with the phrase "authentication secret."

An "identifier" may also be viewed as a principal name or principal ID that the principal may assume for any given context. In an embodiment, a principal has a single identifier and multiple authentication secrets that can be used with that single identifier. In another embodiment, the principal has multiple identifiers, and any given identifier can be used with each of the principal's available authentication secrets, or single one of the identifiers is usable with a subset of authentication secrets associated with the principal.

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

The principal's identity for any given context is resolved by authentication techniques that engage an identity service or password service. The password service may be subsumed within or be a part of the identity service. Alternatively, the password service may be a stand alone service that does not interact with and is not dependent on the identity service.

An "identity service" refers to a special type of service that is designed to manage and supply authentication services and authentication information for resources. So, an identity service may authenticate a given principal for access to a variety of local and external resources known to that identity service. In addition the identity service itself may be viewed as a type of resource. In this manner, identity services may authenticate and establish trust with one another viewing one another as a specific type of resource. An identity service may also enlist the assistance of other resources or services to perform any given authentication on a principal.

According to an embodiment, some example identity services, which may be modified to achieve the teachings presented herein, are described in "Techniques for Dynamically Establishing and Managing Authentication and Trust Relationships," filed on Jan. 27, 2004, and having the U.S. Ser. No.: 10/765,523; "Techniques for Establishing and Managing a Distributed Credential Store," filed on Jan. 29, 2004, and having the U.S. Ser. No.: 10/767,884; and "Techniques for Establishing and Managing Trust Relationships," filed on Feb. 3, 2004, and having the U.S. Ser. No.: 10/770,677; all of which are commonly assigned to Novell, Inc., of Provo, Utah and the disclosures of which are all incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

Various embodiments of this invention can be implemented in existing network architectures, security systems, data centers, and/or communication devices. For example, in some embodiments, the techniques presented herein are implemented in whole or in part in the Novell® Access Manger® product, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
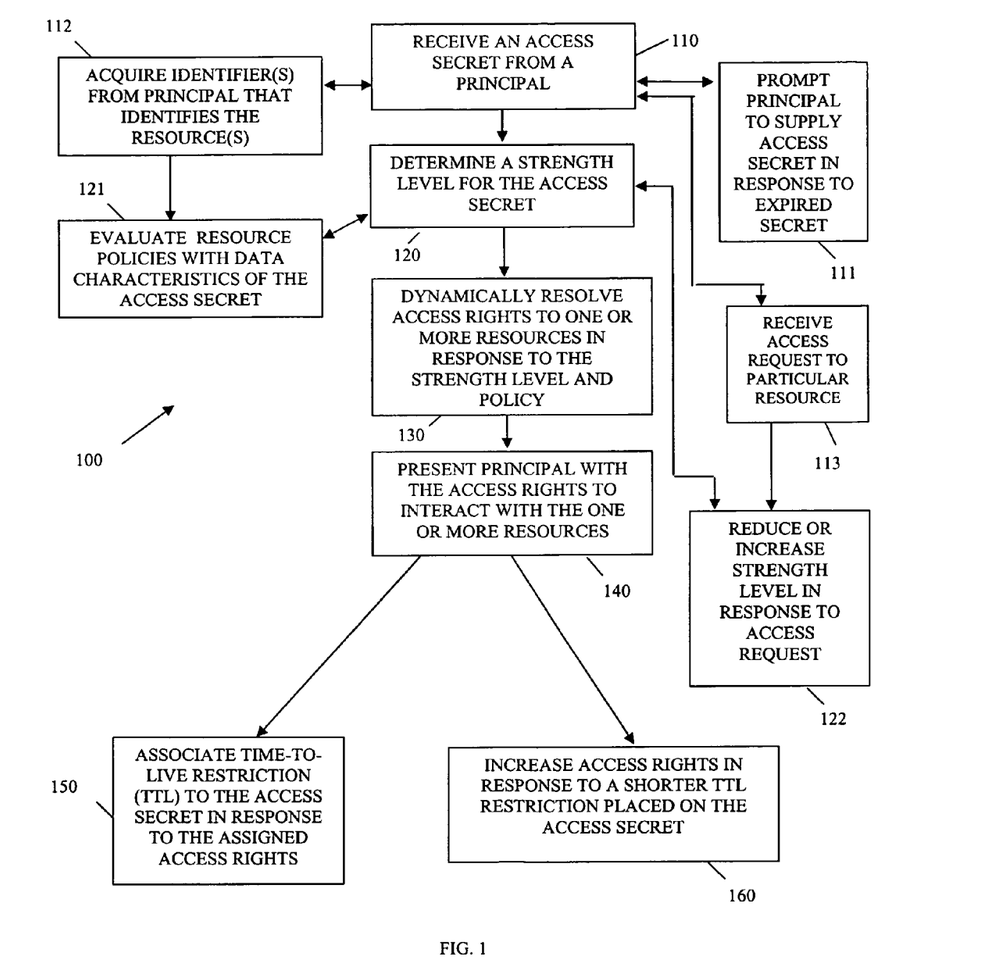
FIG. 1 is a diagram of a method for enforcing security using variable security information, according to an example embodiment.

FIG. 1 is a diagram of a method 100 for enforcing security using variable security information, according to an example embodiment. The method 100 (hereinafter "access service") is implemented as instructions in a machine-accessible and readable medium. The instructions when executed by a machine perform the processing depicted in FIG. 1. The access service is also operational over and processes within a network. The network may be wired, wireless, or a combination of wired and wireless.

Initially, access mechanisms for a given or target resource may be organized around that resource. That is, access rights and permissions are resource specific and resource centric. Policy drives different levels of access rights and these policies are managed and evaluated by the access service. Users, such as principals, can set their own access secrets, such as passwords, for a target resource via interactions with the access service.

Accordingly, at 110, the access service receives an access secret from a requesting principal. The access secret may be a password, a piece of biometric information, a key, a digital certificate, multiple or combinations of these above-listed items, etc. This access secret is being received in response to a variety of potential situations in which the principal wants to have access rights established or re-established for a target resource so that the principal may access the target resource.

As one example as to when the principal may contact or be redirected to the access service for access rights to a target principal, consider, at 111, that an existing access secret for the principal has expired. In such a situation, the access service may prompt the principal to change the expired access secret to a new access secret.

In other cases, the principal may directly contact the access service to initially set up access rights to a desired or targeted resource. Accordingly, at 112, the access service may also receive one or more identifiers for the target resources from the principal. These identifiers permit the access service to locate an appropriate policy to evaluate vis-à-vis the supplied access secret that accompanies the identifiers for specific resources.

In another case, at 113, the access service may receive from the principal a particular access request for a particular resource. So, the access service may receive an access secret, an identifier for a particular resource, and a proposed operation or an access request that the principal wants to perform against the particular resource. Each piece of this information, various combinations of this information, and/or all of this information may be utilized by the access service to locate a particular policy to apply against the access secret for purposes of ultimately establishing access rights for the principal to the desired resource.

At 120, the access service determines a strength level for the access secret. A strength level may be a defined characteristic of the access secret. The strength level may also be defined by policy that identifies the characteristics. Additionally, the strength level may be custom when an enterprise identifies a specific pattern that is to be accounted for. The strength level may be computed and then mapped to any desired scale, such as a scale from 1 to 10 or from 1 to 100. It can be computed using a variety of factors, such as character types (punctuation, digits, symbols, etc.) used in the received access secret, string length (number of characters) for the received access secret, absence of recognized substrings included within the access secret (i.e., is any substring included within the access secret a recognized word in a dictionary or a proper name, etc.), character capitalization or lower case for any particular character in the access secret, and/or various combinations of these and other factors.

According to an embodiment, at 121, the access service may evaluate resource policy using the data characteristics of the access secret to determine the strength level. So, the particular algorithm that resolves (computes and maps to a scale) the strength level may be resource specific and a policy for a given resource may identify the algorithm to use against the data characteristics of the supplied access secret for purposes of determining the strength level for the access secret. In some cases, the access service may also use temporal or other characteristics or other constraints, such as sub-net to determine if the access request is coming from behind the firewall or outside the firewall.

Also in an embodiment, at 122, the access service may reduce or increase the desired strength level that it expects to see from the access secret in response to any particular access request or operation that may have also accompanied the access secret. In other words, the access service may, via policy, expect to see a higher or increased strength level for certain proposed operations that the principal wants to perform on a target resource. So, if a manager (principal) wanted to write information (access request) to an employee database (target resource), policy (determined based on the identity of the manager, the employee database, and the write operation) may drive the access service to require that a certain strength level for the access secret be achieved by the principal.

At 130, the access service dynamically resolves access rights to one or more resources in response to the determined strength level associated with the principal-supplied access secret and policy. Again, the policy evaluated and used may be associated with and resolved in response to the principal, the targeted resource, a group of resources, proposed operations (access requests), and/or various combinations or all of these things. The strength level is identified or mapped within the policy to a particular set of access rights.

At 140, the access service presents to the principal the access rights, which the principal can then use to interact with the one or more resources or with a target or desire resource. At this point, the access service may also establish a temporary account or identity for an identifier associated with the principal and the access secret. This may be done via communication with an identity service that manages authentication for the resource or resources or it may be handled by the access service. So, when the principal presents the identifier and the access secret to an authentication service of the resource(s), the principal is authenticated properly and assigned the access rights resolved at 130.

In some cases, the access secret may, at 150, be associated with a time-to-live restriction. This time-to-live restriction may also be dynamically set in response to policy associated with the assigned access rights. So, access rights associated with non volatile operations, such as read operations, may have a longer time-to-live restriction whereas access rights associated with volatile operations, such as write operations, may have a shorter time-to-live restriction. It may also be the case that the strength level for the access secret defines the length or the time-to-live restriction in connection with the access rights. So, a longer time-to-live restriction may be assigned for volatile operations if the strength level of the access secret is sufficiently high enough when compared to some predefined threshold value or range of values.

In another situation, at 160, the access service may actually permit the access rights to be increased in situations where the principal accepts a shorter duration time-to-live restriction associated with the principal-supplied access secret. So, a principal may be permitted, pursuant to policy, to have a lower strength level for the access secret and still perform a volatile operation against a resource, if the principal agrees to let the access secret expire or become invalid after a short period of time (e.g., time-to-live restriction of one hour).

Access rights themselves are customizable as well depending upon the context in which they are exercised. So, a principal operating within a firewall may have more privileges or access rights then the same principal operating from outside the firewall. Thus, the access rights may be more complex then just simple assignment of read and/or write access to a particular resource or group of resources; access rights may be defined for given contexts or situations within which the principal may attempt to access a target resource. These contexts may also be defined and resolved pursuant to policy.

Figure 2:
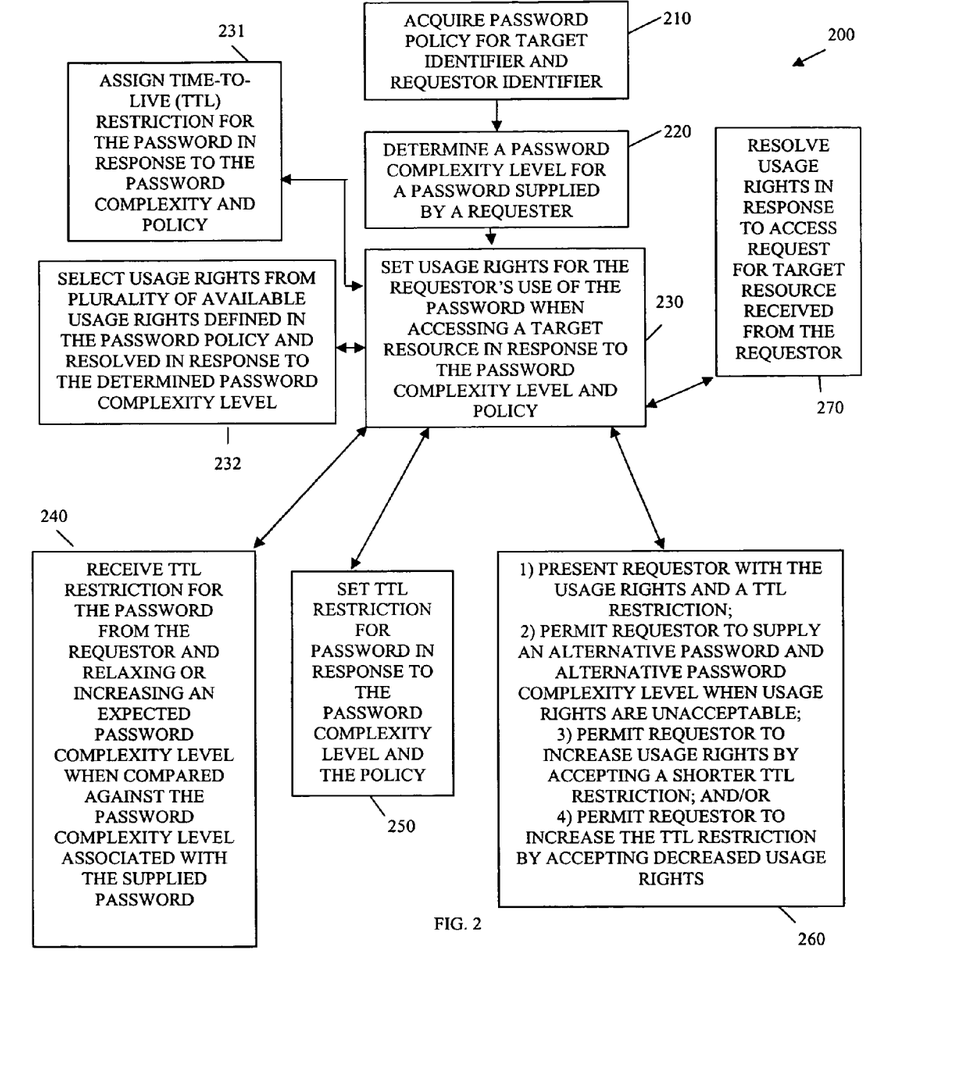
FIG. 2 is a diagram of another method for enforcing security using variable security information, according to an example embodiment.

FIG. 2 is a diagram of another method 200 for enforcing security using variable security information, according to an example embodiment. The method 200 (hereinafter "password service") is implemented in a machine-accessible and readable medium as instructions. The instructions when executed by a machine perform the processing depicted in the FIG. 2. Moreover, the password service is operational over a network, and the network may be wired, wireless, or a combination of wired and wireless. The processing associated with the password service presents an alternative perspective to the processing associated with the access service described above with the method 100 and within the context of the FIG. 1.

At 210, the password service acquires a password policy. The password policy is acquired in response to receipt of a target resource identifier for a target resource and a requester identifier for a requestor. The requestor desires access to the target resource. The requestor directly or indirectly (such as through a proxy or redirection within a browser) makes a request to the password service for purposes of establishing usage rights, an account, or temporary identity to access the target resource. The password service uses, inter alia, identifiers that permit it to recognizes the requestor and the target resource desired by the requester. These identifiers assist the password service in selecting and subsequently evaluating the proper password policy from a data store or listing of available password policies, which may be accessible to the password service.

At 200, the password service determines a password complexity level for a password that is supplied and being proposed by the requestor. The password complexity level may be viewed as a number or rating that appears along a scale. In some cases, the scale may be predefined and known and in other cases the scale may be dynamically defined or resolved. Initially, characteristics of the password supplied are computed using a generic or resource-specific algorithm to produce a number or rating that corresponds to the scale or that can be mapped to the scale. The final mapped number to the scale represents the password complexity level. Some example characteristics of a supplied password that may be computed to generate the level were discussed above with respect to the access service represented by the method 100 of the FIG. 1. Again, the actual algorithm that processes against the supplied password characteristics may be generic (used for multiple resources or environments), specific (used for a defined resource), or a combination of generic and specific (used for groupings of resources or specific resource types).

At 230, the password service evaluates the policy in view of the determined password complexity level for the requestor-supplied password, the target identifier, and the requestor identifier. The relationship between this information is defined in the password policy and helps resolve specific usage rights for the requestor with respect to the target resource. The password service then sets these usage rights for the requestor-supplied password and requestor identifier combination; thereby creating an account or temporary identity that may be used to access the target resource.

In an embodiment, at 231, the password service may also assign a time-to-live restriction for the requestor-supplied password in response to evaluation of the password policy and the password complexity level. So, the account or temporary identity may be associated with a limitation or attribute that indicates the account is only valid for a certain period of time. When that time (time-to-live restriction) expires, the requestor-supplied password will no longer be valid and will no longer be associated with the usage rights.

According to an embodiment, at 232, the password service may also select the usage rights that were assigned from a plurality of available usage rights that are defined in the password policy. Each different set of usage rights is associated with a different password complexity level or range of password complexity levels. So, a more complex level (higher computed value relative to a middle value along a resolved or defined scale) may have a set of increased usage rights whereas a lower complex level (lower computed value relative to a middle value along a resolved or defined scale) may have a different set of lesser usage rights. Each complexity level or range of complexity levels are defined within the password policy and mapped to specific sets of usage rights. Thus, the more complex password that the requestor supplies; the requestor may receive greater usage rights to the target resource. Other factors may play into whether increased usage rights are assigned within the policy as well, such as the requester identifier, the resource identifier, and even the length of any time-to-live restriction.

In some cases, at 240, the password service may actually receive a proposed time-to-live restriction for the requestor-supplied password from the requestor. The password service may then dynamically re-evaluate the password policy and may dynamically alter the usage rights to either increase them or decrease them depending upon the dictates of the password policy being evaluated and the proposed duration of the time-to-live restriction received from the requestor. Thus, a requestor with a relatively low or lower password complexity level having initial minimal usage rights may propose a time-to-live restriction of a short period of time, such as one hour; in response, the password service evaluates the policy and if permissible increases the usage rights for the requestor-supplied password. Conversely, a higher duration for a time-to-live restriction may, pursuant to the password policy, result in decreased usage rights to the target resource even if the password complexity level is higher than average or normal (predefined on a password complexity level scale).

In fact, at 250, the password service may set time-to-live restriction for the requestor-supplied password in direct response to the determined password complexity level. So, the password service may set the time-to-live restriction initially for the requestor-supplied password and this may or may not be subsequently changed by the requestor, as was defined above with respect to the processing of 240. Again, the interdependence among the password complexity level, the time-to-live restriction, and the usage rights may be defined and resolved by the password service dynamically evaluating the password policy.

In still more embodiments, at 260, the password service may perform a variety of additional processing. For example, the password service may present the assigned usage rights and a time-to-live restriction to the requestor in response to the initially requestor-supplied password for requestor acceptance or requestor modification (assuming such modification comports with the password policy). So, the password service may permit the requestor to supply an alternative password having an alternative or different password complexity level when the assigned usage rights and/or the time-to-live restriction are unacceptable to the requestor. This permits the requester and policy to achieve the proper balance for the password being created. Such control and customization has not been achievable with current techniques in the industry.

As another example, the password service may permit the requestor (as was discussed above) to increase the assigned usage rights by accepting a shorter duration time-to-live restriction with the requestor-supplied password. Thus, the requestor does not have to change the password to increase usage rights; the requestor may be able to just accept or assign a shorter duration for which the supplied password is usable or viable to access the target resource. Similarly, the password service may permit the requestor to increase a duration of the proposed or assigned time-to-live restriction for the password, if the requester agrees to accept decreased usage rights to the target resource.

The password service and the requestor interact with one another to achieve a custom degree of password complexity and usage rights. This is done in accordance with password policy to ensure the proper balance in security and to ensure usability from the point of view of the requestor.

It is also noted that although the time-to-live restriction was discussed in terms of a time metric, this does not have to always be the case. That is, the restriction as to when a particular password becomes invalid may be based on other limitations, such as transaction numbers or events. For example, a time-to-live restriction may be defined in terms of the maximum number of accesses that the requestor has with a target resource. This may be as few as one access transaction or as many as several thousand access transactions. This assumes that the resource or some front-end service of the resource is capable of tracking and reporting access transactions for a given requestor.

Similarly, the time-to-live restriction may be defined in terms of an event, such as a write transaction. So, if a requestor makes a write transaction to a target resource, the password may become immediately invalid to access the resource or it may be invalid on the next session or next access attempt. The point is that the time-to-live restriction does not always have to be defined relative to a time duration; it can also be used in connection with transaction occurrences and/or events to invalidate or expire a password.

Figure 3:
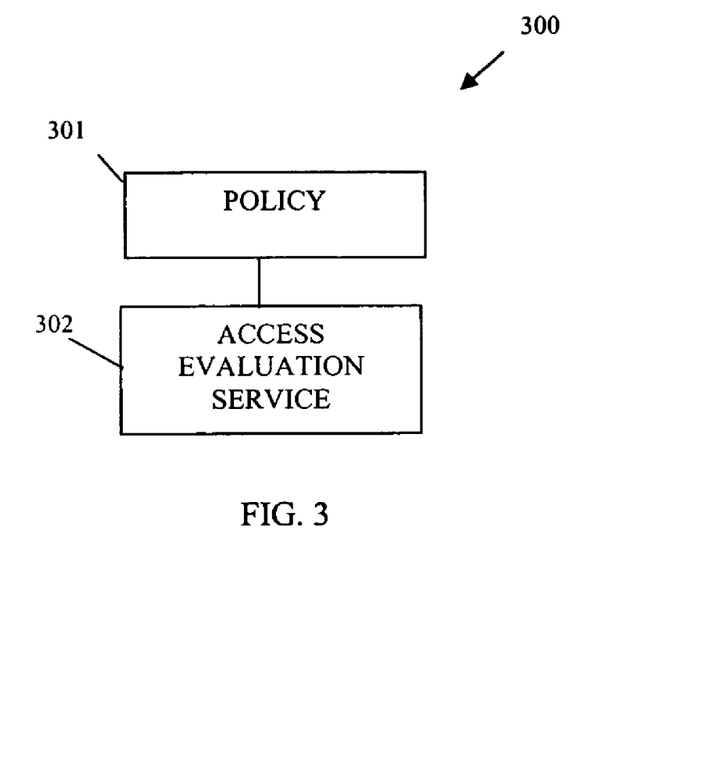
FIG. 3 is a diagram of a variable security access system, according to an example embodiment.

FIG. 3 is a diagram of a variable security access system 300, according to an example embodiment. The variable security access system 300 is implemented as instructions on or within a machine-accessible and readable medium. The instructions when executed by a machine perform processing depicted with respect to the methods 100 and 200 of the FIGS. 1 and 2, respectively. The variable security access system 300 is also operational over a network and the network may be wired, wireless, or a combination of wired and wireless.

The variable security access system 300 includes a policy 301 and an access evaluation service 302. Each of these and their interactions with one another will now be discussed in turn.

The policy 301 defines in a structured and consistent data format the dependencies between sets of access rights to a given resource and to requesting principals, access secret complexity levels, and perhaps time-to-live restrictions associated with a given access secret complexity level. The policy 301 may be stored in a data store, such as a data warehouse, a database, a directory, a file, or various combinations of these things.

The policy 301 may be indexed on a variety of information, such as the identities or identifiers associated with identities representing the requesting principal, the target resource, the access secret complexity level, the access evaluation service 302, or various combinations of these identities or identifiers. So, any particular instance of a policy 301 can be acquired when a given context presents itself, such as when a principal is supplying a proposed access secret to gain access rights to a particular target resource and such situation is being processed by a particular instance of the access evaluation service 302.

The access evaluation service 302 resolves the particular instance of the policy that is needed for any given context, by perhaps searching the data store with the proper identifiers involved in any given transaction or context. Once the proper instance of the policy 301 is acquired, the access evaluation service proceeds to evaluate the policy instance 301 for purposes of dynamically setting access rights for the requesting principal to access a target resource using a principal-supplied access secret. The policy 301 may also dictated that the access secret be assigned and associated with a specific time-to-live restriction, such that when the time-to-live restriction is satisfied the principal-supplied access secret is no longer valid (the principal-supplied access secret becomes invalid).

To properly dynamically evaluate the policy instance 301 for any given context or transaction, the access evaluation service 302 computes a first complexity level on the principal-supplied access secret. This first complexity level is then compared against other or second complexity levels or ranges of complexity levels defined within the policy instance 301. Examples of computing complexity levels were supplied above with respect to the methods 100 and 200 of the FIGS. 1 and 2. When the first complexity level comports or matches with a second complexity level defined within the policy instance 301, the access evaluation service 302 can acquire the desired access rights for a given target resource and may also acquire a given time-to-live restriction or permissible range or time-to-live restrictions.

In some embodiments, the access evaluation service 302 may also dynamically and in real time permit a principal to increase access rights, assuming the policy 301 permits, when the principal agrees or sets a lower time-to-live restriction for a principal-supplied access secret and/or when the principal supplies a new or altered access secret that has an increased access complexity level from what the principal originally supplied. Again, the policy 301 may have a variety of target complexity levels or range of target levels for which the access evaluation service 302 can compare against once the access evaluation service computes a principal-supplied access complexity level for the access secrets proposed by the principal.

It may also be that the principal dynamically requests increased access rights at which point, the access evaluation service 302 instructs the principal to provide another access secret having an increased complexity level. The specific or minimal complexity level may also be communicated to the principal, so the principal does not have to guess as to what is being requested.

According to an embodiment, the specific operation that the principal desires to perform on a target resource may also be communicated to the access evaluation service 302 along with the principal-supplied access secret. This operation may be referred to as an access request. The policy 301 may also define the interplay between access complexity levels with respect to specific access operations for specific target resources. So, the access evaluation service 302 can determine whether the principal-supplied access secret has sufficient complexity for the access rights needed by the principal to perform the proposed access operation (access request).

It should be noted that it is implicit in what has been described herein and above that should a principal or requestor not provide a sufficient complexity level for the access secret or password, then the desired or principal expected access rights to the target resource are not supplied. In some cases, this may be affirmatively communicated to the principal, such that the principal is fully aware of the situation. In other cases, the principal may not be aware of this situation until the principal attempts an access that is denied. In other words, suppose a principal supplies a complexity level of 1 for read access on an employee database (target resource), but the principal wants to write (complexity level 2) to the employee database. In this example, the principal may be given read access and attempt a write access that is denied. It may also be that the principal is affirmatively informed that the access is just for read operations at the time that the access is set up for the employee database.

Figure 4:
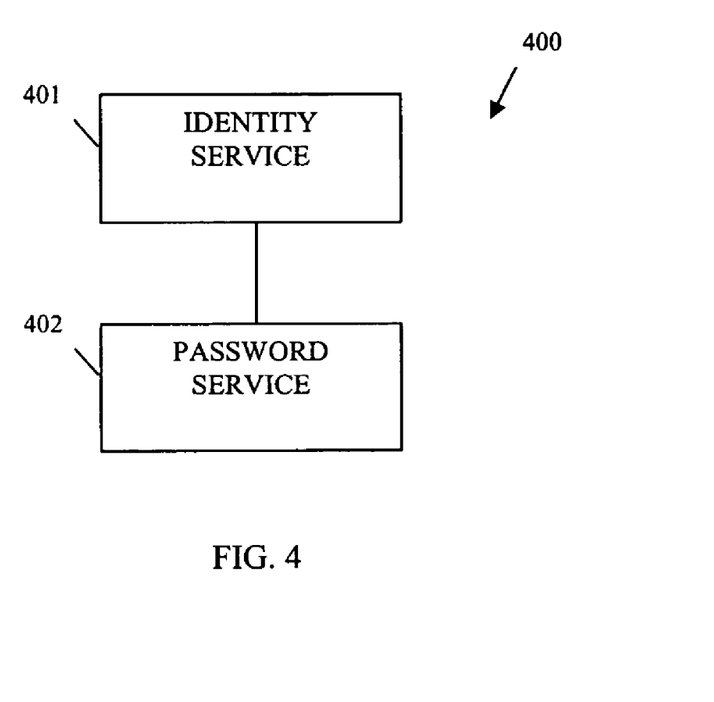
FIG. 4 is a diagram of another variable security access system system, according to an example embodiment.

FIG. 4 is a diagram of another variable security access system 400, according to an example embodiment. The variable security access system 400 is implemented as instructions on or within a machine-accessible and readable medium. The instructions when executed by a machine also perform, among other things; the processing depicted with respect to the methods 100 and 200 of the FIGS. 1 and 2, respectively. The variable security access system 400 is also operational over a network and the network may be wired, wireless, or a combination of wired and wireless. The security access system 400 presents a different perspective and architecture to what was presented with the variable security access system 300 described above with reference to the FIG. 3.

The variable security access system 400 includes an identity service 401 and a password service 402. Each of these and their interactions with one another will now be discussed in turn.

It is noted that the architectural layout of the variable security access system 400 is presented for purposes of illustration only and not by way of limitation. Thus, in some cases the processing of the password service 402 may be subsumed into the identity service 401 and vice versa.

The identity service 401 serves as an authentication and access front end to target resources. The password service 402 may be viewed as a plug-in to assist facilitating accounts or identities that identity service 401 manages. These identities when authenticated to the identity service 401 are assigned certain access rights. The access rights are also initially established when the identities are set up and thus are initially created by the password service 402.

The identity service 401 manages passwords and access rights associated with those passwords for target resources. Thus, before a requestor can access a given target resource, that requester authenticates to the identity service 401 (either knowingly or unknowingly via a proxy or redirection) using a specific password. Once authenticated, the identity service 401 provides the corresponding access rights for the sessions or transactions that the requestor will perform against the target resource. Initial set up of the password and assignment of the proper access rights is handled by the password service 402.

When a requestor desires to setup access or to re-establish previously expired access to a target resource, the requester either directly or indirectly (such as via a proxy or redirection) interacts with the password service 402. Initially, this entails that the requestor authenticate to the password service 402 so that the password service 402 knows that it is dealing with an authorized resource. It is noted that this initial authentication may be facilitated or achieved via the identity service 401; although it does not have to be this way.

Once authenticated to the password service 402, the requestor supplies a proposed password for a target resource. The password service 402 then evaluates the password complexity level (in manners described in detail above) and acquires the proper policy to evaluate for the target resource. The policy evaluation then maps the password to a specific set of access rights. If accepted by the requester, the password service 402 interacts with the identity service 401 to set up a temporary identity or account for the requestor to authenticate to the target resource using the requestor-supplied password to acquire the assigned access rights.

It is noted that any particular resource may be associated with multiple customized sets of access rights. Each set of access rights associated via policy to a specific password complexity level or range of password complexity levels. The password service 402 dynamically evaluates the policy to resolve the specific set of access rights to assign to a given requestor-supplied password within the identity service 401.

It is also noted that in addition to access rights, any given requestor-supplied password may be associated with a time-to-live restriction. When the time-to-live restriction is satisfied (either via an elapsed duration or time, via a maximum number of transactions or access, or via an occurrence of an event or set of events), the identity service 401 will terminate the usage of the requestor-supplied password and no longer permit the requester to authenticate to the target resource via that password.

There may also be interdependences between the password complexity levels and the time-to-live restrictions, such that greater time-to-live restrictions may relax the complexity level needed for the proposed password and such that lesser time-to-live restrictions may increase the complexity level needed for the proposed password.

The password service 402 may also dynamically interact with the requestor, such that the requestor can alter, accept and change factors when initially setting up the temporary identity or account to access the target resource. So, the requestor may be informed of certain access rights or time-to-live restrictions and may subsequently use that information to achieve the proper balance desired by the requester. Thus, the requestor may later modify or alter just the time-to-live restriction, just the password complexity level via a new proposed password, just the access rights (which may necessitate other changes that the password services enforces on the requester), just a proposed access operation, or various combinations of these things.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a non-transitory machine-readable medium and for executing on a machine, comprising:

receiving, by the machine, an access secret from a principal;

determining, by the machine, a strength level for the access secret received from the principal, the access secret is an authentication secret and is not an identifier for the principal;

resolving, by the machine, access rights to one or more resources in response to the strength level and policy; and presenting, by the machine, the principal with the access rights, which are associated with the principal and the access secret, to interact with the one or more resources.

2. The method of claim 1, wherein receiving further includes prompting the principal to supply the access secret in response to a previous access secret that is detected as being expired.

3. The method of claim 1, wherein receiving further includes acquiring from the principal with the access secret one or more identifiers that identify the one or more resources that the principal wants the access rights to.

4. The method of claim 3, wherein determining further includes evaluating one or more resource policies vis-à-vis data characteristics associated with the access secret to determine the strength level.

5. The method of claim 1, wherein receiving further includes receiving an access request to a particular resource from the principal with the access secret.

6. The method of claim 5, wherein determining further includes reducing the strength level or increasing the strength level in response to the access request and the particular resource identified by the principal.

7. The method of claim 1 further comprising, associating, by the machine, a time-to-live restriction to the access secret in response to the assigned access rights, wherein when the time-to-live restriction expires the access secret becomes invalid to access the one or more resources.

8. The method of claim 1 further comprising, increasing, by the machine, the access rights in response to a shorter time-to-live restriction placed on the access secret, wherein when the time-to-live restriction expires the access secret becomes invalid to access the one or more resources.

9. A method implemented in a non-transitory machine-readable medium for executing on a machine, comprising:

acquiring, by the machine, a password policy in response to a target resource identifier for a target resource and in response to a requestor identifier for a requestor that desires access to the target resource;

determining, by the machine, a password complexity level for a password supplied from the requestor, the password is supplied with the requestor identifier from the requestor and the password complexity level is computed based on characteristics of the password supplied; and setting, by the machine, usage rights for the requestor's use of the password when accessing the target resource in response to the determined password complexity level and evaluation of the password policy.

10. The method of claim 9, wherein setting further includes assigning a time-to-live restriction to the password in response to the determined password complexity and the password policy, wherein when the time-to-live restriction expires the password becomes invalid for use with the target resource.

11. The method of claim 10 further comprising, receiving the time-to-live restriction from the requestor with the password and in response thereto relaxing or increasing an expected password complexity level that is compared against the determined password complexity level vis-à-vis the password policy.

12. The method of claim 9 further comprising, setting a time-to-live restriction for the password in response to the determined password complexity level and the password policy, wherein when the time-to-live restriction expires the password of the requestor becomes invalid to access the target resource.

13. The method of claim 9, wherein setting further includes selecting the usage rights from a plurality of available usage rights defined in the password policy and resolved in response to the determined password complexity associated with the supplied password.

14. The method of claim 9 further comprising, receiving, by the machine, an access request from the requestor with the password, wherein the access request is defined in the password policy and is associated within the password policy with a target password complexity level, which comports with the determined password complexity level, in order for the usage rights to be assigned to the password.

15. The method of claim 9 further comprising one or more of the following:
- presenting, by the machine, the requestor with the usage rights along with a time-to-live restriction that indicates for how long the password is valid to access the target resource with the presented usage rights;
- permitting, by the machine, the requestor to supply an alternative password having an alternative password complexity level when the usage rights are unacceptable to the requestor;
- permitting, by the machine, the requestor to increase the usage rights by accepting a shorter time-to-live restriction that is associated with how long the password is valid to access the target resource with the presented usage rights;
- permitting, by the machine, the requestor to increase the time-to-live restriction by accepting a decrease in the usage rights to the target resource.

16. A machine-implemented system, comprising:
a machine configured with:
a policy; and
an access evaluation service for executing on the machine, the access evaluation service is to resolve access rights to a target resource for a requesting principal in response to evaluation of the policy and in also in response to a principal-supplied access secret having a first complexity level that is computed, the principal-supplied access secret is provided by the requesting principal and is an authentication secret used for initially authenticating the principal, and the policy associates the access rights with the first complexity level and also includes other sets of access rights associated with other complexity levels for the target resource.

17. The system of claim 16, wherein the access evaluation service is to set a time-to-live restriction on the access rights for the target resource in response to the policy and the first complexity level for the principal-supplied access secret.

18. The system of claim 17, wherein the policy permits a relaxing of a target complexity level for the principal-supplied access secret for a shorter duration version of the time-to-live restriction.

19. The system of claim 17, wherein the policy dictates an increase in a target complexity level for the principal-supplied access secret associated with a longer duration version of the time-to-live restriction.

20. The system of claim 16, wherein the access evaluation service is to also use a proposed access request supplied by the principal with the principal-supplied access secret to resolve the access rights via the policy.

21. A machine-implemented system, comprising:
a machine configured with:
an identity service to execute on the machine; and
a password service to execute on the machine, the identity service is to manage passwords for and corresponding access rights to target resources, the passwords and the access rights are to be initially established by the password service via interactions with the identity service, and the password service is to further interact with requestors that desire to establish the passwords, and the password service is to also resolve and enforce password complexity levels and is to map any particular password complexity level to a particular set of access rights for a particular target resource, a given set of access rights for a given principal is then dynamically determined based on a supplied password from a the given principal.

22. The system of claim 21, wherein the password service is to associate time-to-live restrictions with the passwords established in the identity service for the requestors of the target resources.

23. The system of claim 21, wherein any particular target resource may be associated with multiple sets of the access rights, wherein each particular set is associated with a particular password complexity level.

24. The system of claim 21, wherein associations between the password complexity levels and the sets of the access rights are resolved via dynamic policy evaluations performed by the password service.

25. The system of claim 21, wherein a desired password complexity level is increased or decreased in response to the password service receiving one or more of the following from a particular requestor a shortened time-to-live restriction, a lengthened time-to-live restriction, and a particular access operation to perform on a particular target resource.

* * * * *

UNITED STATES PATENT AND TRADEMARK OFFICE
CERTIFICATE OF CORRECTION

| | | |
|---|---|---|
| PATENT NO. | : 7,845,003 B2 | Page 1 of 1 |
| APPLICATION NO. | : 11/590121 | |
| DATED | : November 30, 2010 | |
| INVENTOR(S) | : Cameron C. Morris et al. | |

It is certified that error appears in the above-identified patent and that said Letters Patent is hereby corrected as shown below:

In column 14, line 32, in Claim 21, delete "a the" and insert -- a --, therefor.

Signed and Sealed this
Eighth Day of February, 2011

David J. Kappos
*Director of the United States Patent and Trademark Office*